(12) United States Patent
Lee

(10) Patent No.: US 10,820,195 B2
(45) Date of Patent: Oct. 27, 2020

(54) DIGITAL SIGNAGE SYSTEM AND PAIRING METHOD OF THE SAME

(71) Applicant: Acer Incorporated, New Taipei (TW)

(72) Inventor: Chun-Hua Lee, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 0 days.

(21) Appl. No.: 16/293,773

(22) Filed: Mar. 6, 2019

(65) Prior Publication Data

US 2019/0281451 A1 Sep. 12, 2019

(30) Foreign Application Priority Data

Mar. 8, 2018 (TW) .............................. 107107897 A

(51) Int. Cl.
| | |
|---|---|
| *G06F 15/177* | (2006.01) |
| *H04W 12/00* | (2009.01) |
| *H04W 12/06* | (2009.01) |
| *H04W 8/00* | (2009.01) |
| *H04L 29/08* | (2006.01) |
| *H04L 12/24* | (2006.01) |

(52) U.S. Cl.
CPC ... *H04W 12/00305* (2019.01); *H04L 41/0809* (2013.01); *H04L 67/303* (2013.01); *H04W 8/005* (2013.01); *H04W 12/0608* (2019.01)

(58) Field of Classification Search
CPC ....... H04W 12/00305; H04W 12/0608; H04W 8/005; H04L 41/0809; H04L 67/303
USPC ........................................................ 709/220
See application file for complete search history.

(56) References Cited

U.S. PATENT DOCUMENTS

| 8,743,753 B2 | 6/2014 | Lin et al. |
|---|---|---|
| 9,578,444 B1 | 2/2017 | Pan et al. |

(Continued)

FOREIGN PATENT DOCUMENTS

| CN | 101005415 A | 7/2007 |
|---|---|---|
| CN | 102736599 A | 10/2012 |

(Continued)

OTHER PUBLICATIONS

Chinese language office action dated Nov. 7, 2018, issued in application No. TW 107107897.

(Continued)

*Primary Examiner* — Wing F Chan
*Assistant Examiner* — Joseph R Maniwang
(74) *Attorney, Agent, or Firm* — McClure, Qualey & Rodack, LLP

(57) ABSTRACT

Provided is a digital signage system including a smart plug and a player. The smart plug is configured to provide power and has a wireless network connection function. The player receives power from the smart plug and has a wireless network connection function. The player uses a network setting to connect and log in to a server via a network base station. The player searches for the smart plug and wirelessly links to the smart plug directly, and the player transmits the network setting and login information for logging in to the server to the smart plug. The smart plug connects to the server via the network base station according to the received network setting, and the smart plug logs in to the server with the received login information thereby pairing the smart plug with the player.

6 Claims, 2 Drawing Sheets

(56) References Cited

U.S. PATENT DOCUMENTS

| | | | |
|---|---|---|---|
| 2016/0087811 A1* | 3/2016 | Yin | H04L 12/189 |
| | | | 370/312 |
| 2016/0139575 A1* | 5/2016 | Funes | H04L 12/2834 |
| | | | 700/275 |
| 2017/0164418 A1 | 6/2017 | Tsai et al. | |
| 2017/0171802 A1* | 6/2017 | Hou | H04L 63/20 |
| 2017/0257225 A1 | 9/2017 | Pan et al. | |

FOREIGN PATENT DOCUMENTS

| | | |
|---|---|---|
| CN | 103645686 A | 3/2014 |
| CN | 204668642 U | 9/2015 |
| CN | 105025477 A | 11/2015 |
| CN | 106851608 A | 6/2017 |
| TW | 201301168 A | 1/2013 |
| TW | 201712653 A | 4/2017 |
| TW | 201722191 A | 6/2017 |
| TW | 201733308 A | 9/2017 |
| TW | 201733400 A | 9/2017 |

OTHER PUBLICATIONS

Chinese language office action dated Jul. 1, 2020, issued in application No. CN 201810358943.X.

* cited by examiner

DIGITAL SIGNAGE SYSTEM AND PAIRING METHOD OF THE SAME

CROSS REFERENCE TO RELATED APPLICATIONS

This Application claims priority of Taiwan Patent Application No. 107107897, filed on Mar. 8, 2018, the entirety of which is incorporated by reference herein.

BACKGROUND OF THE INVENTION

Field of the Invention

The present invention relates to a digital signage system, and in particular to a digital signage system that can pair a player with a smart plug in the system and can control the player to turn on and off using the smart plug.

Description of the Related Art

Digital signage has been widely used in commercial applications such as roadside billboards and inside shopping malls. Digital signage can be turned off when necessary to reduce energy consumption, such as during non-business hours of a store. Since there may be a large number of digital signage, or they may be placed in hard-to-reach locations (such as along highways or in remote areas, etc.), traditional digital signage systems use a timer to turn the digital signage on and off. However, because an administrator cannot know the operating status of the timer at the remote end, when a timer error occurs, it may cause the digital signage to incorrectly turn on or off, and the administrator cannot find and correct this error in time.

Currently, digital signage usually has a computer host to control the display contents of the digital signage. If the computer host has a network function at the same time, another method of controlling the digital signage system to automatically turn on and off is to remotely control the computer host to turn itself on or off using a wake up message sent over a network (Wake-on-LAN). However, the Wake-on-LAN function is very unreliable, and a computer host often cannot be woken up from the remote end after the computer host has shut down. Once the Wake-on-LAN function fails, the digital signage system cannot be turned on at the remote end. Therefore, a better solution that gives the administrator more control and convenience is needed.

BRIEF SUMMARY OF THE INVENTION

A detailed description is given in the following embodiments with reference to the accompanying drawings.

The present disclosure provides a digital signage system that allows a server to control the digital signage system to turn on and off using a smart plug at the remote end. The present disclosure provides a digital signage system, comprising a smart plug and a player. The smart plug is configured to provide power and has a wireless network connection function. The player receives power from the smart plug and has a wireless network connection function. The player uses a network setting to connect and log in to a server via a network base station. The player searches for the smart plug and wirelessly links to the smart plug directly, and the player transmits the network setting and login information to the smart plug, wherein the login information is used to log in to the server. The smart plug connects to the server via the network base station according to the received network setting, and the smart plug logs in to the server with the received login information thereby pairing the smart plug with the player.

The present disclosure provides the digital signage system as described above, wherein the smart plug can operate in a base station mode and a user mode; the smart plug initially operates in the base station mode, and the smart plug switches from the base station mode to the user mode after receiving the network setting and the login information, and the smart plug applies the network setting to connect the server via the network base station.

The present disclosure provides the digital signage system as described above, wherein a wireless network specification used by the smart plug, the player, and the network base station is a WiFi.

The present disclosure provides the digital signage system as described above, wherein the smart plug can turn the player on and off.

The present disclosure further provides a digital signage system pairing method, comprising using a network setting to make a player connect and log in to a server via a network base station; using the player to search for a smart plug to wirelessly link to the smart plug directly and transmitting the network setting and login information to the smart plug, wherein the login information is used to log in to the server; connecting the smart plug to the server via the network base station according to the network setting received by the smart plug, and logging the smart plug in to the server with the received login information to pair the smart plug with the player.

The present disclosure provides the digital signage system pairing method, wherein the smart plug can operate in a base station mode and a user mode; making the smart plug initially operate in the base station mode, and switching the smart plug from the base station mode to the user mode after receiving the network setting and the login information, and applying the network setting to the smart plug for connecting to the server via the network base station.

The present disclosure provides the digital signage system pairing method, wherein a wireless network specification used by the smart plug and the player is a WiFi.

The present disclosure provides the digital signage system pairing method, further turning the player on and off using the smart plug.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
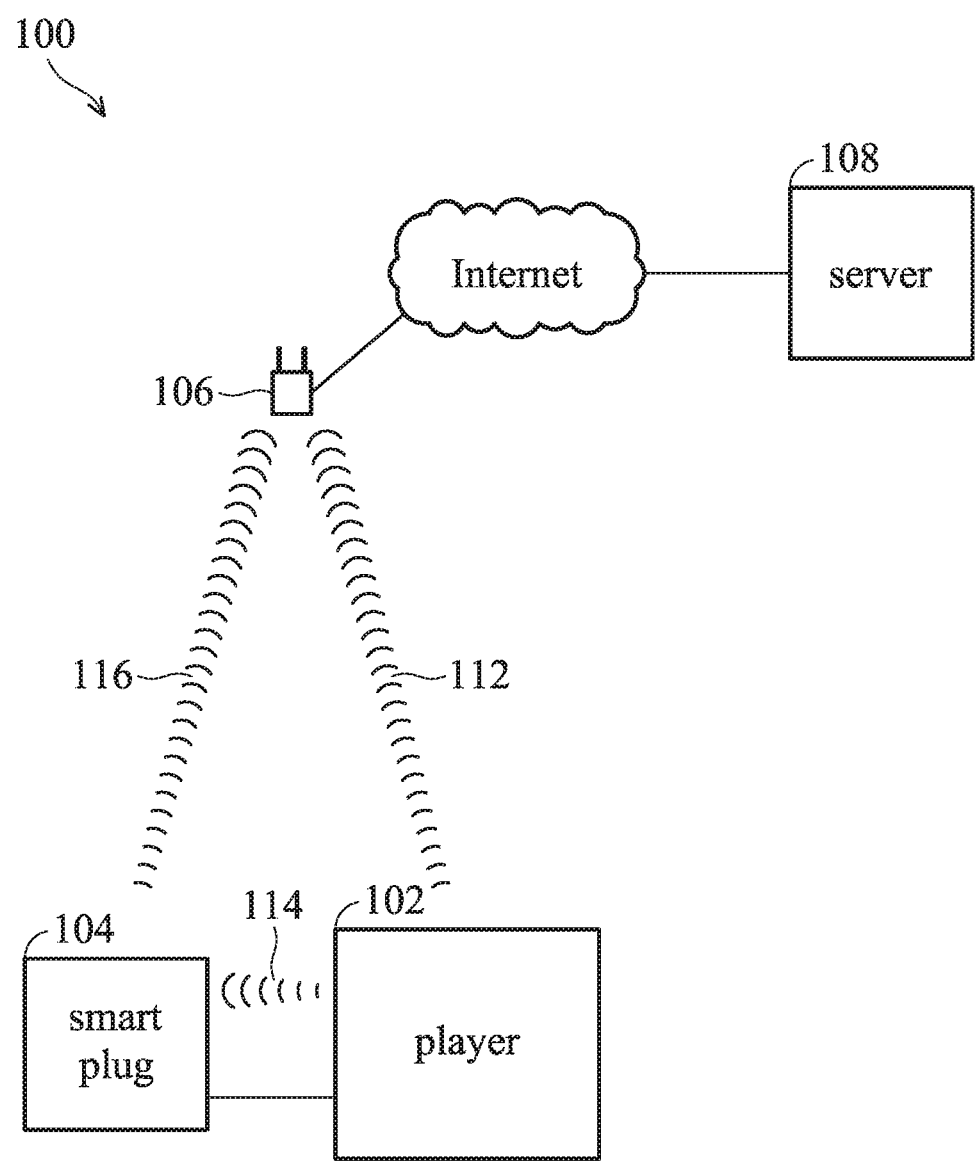
FIG. 1 is a circuit block diagram and its connection diagram of a digital signage system according to an embodiment of the present disclosure.

FIG. 1 is a circuit block diagram and its connection diagram of a digital signage system according to an embodiment of the present disclosure. The digital signage system 100 includes a player 102 and a smart plug 104. A network base station 106 provides the internet connection to other devices. A server 108 is a server located at the remote end of the internet.

The player 102 is a multimedia player having a wireless network connection function. The smart plug 104 is a plug having the wireless network connection function. In this embodiment, the smart plug 104 is connected to the city power network (not shown in FIG. 1) and provides power to the player 102.

In this embodiment, the wireless network specification used by the player 102, the smart plug 104 and the network base station 106 is a WiFi, but it is not limited thereto. Any wireless communication standard can be adopted as long as it can link the player 102, the smart plug 104 and the network base station 106.

When the digital signage system 100 is turned on for the first time, the player 102 is first connected to the network base station 106. In this embodiment, the player 102 searches for a Service Set Identifier (SSID) in the WiFi specification of the network base station 106, and the player 102 uses the password of the SSID of the network base station 106 to connect the network base station 106 (i.e., the wireless link 112 of FIG. 1). After the establishment of the wireless link 112 with the network base station 106, the player 102 can connect to the Internet and further connect a server 108 to the Internet and use login information (Provision Information) to log in to the server 108. After the player 102 completes logging in to the server 108, the server 108 records that the player 102 is online in its own database and records relevant information.

In this embodiment, the smart plug 104 can operate in a base station mode and a user mode under the WiFi standard. When the digital signage system 100 is turned on, the smart plug 104 operates in the base station mode by default. After the player 102 completes logging in to the server 108, the player 102 then starts to search for the SSID of the smart plug 104. In a preferred embodiment, the SSID of the smart plug 104 may include the name "smartplug" to facilitate the search by the player 102. After the player 102 has found the SSID of the smart plug 104, the player 102 disconnects the link from the network base station, and the player 102 establishes a wireless communication link to the smart plug 104 (i.e., the wireless link 114 of FIG. 1). The player 102 uses a network setting to connect the network base station 106, such as the SSID and the password of the network base station 106, and the player 102 transmits login information for logging in to the server to the smart plug 104.

When the smart plug 104 receives the network setting and the login information, the smart plug 104 switches the WiFi operation mode to the user mode to prevent the connection of other devices. At this time, the connection between the player 102 and the smart plug 104 also ends, and the player 102 re-establishes a wireless link 112 to connect to the network base station 106 and log in to the server 108 using the above method.

After the smart plug 104 switches to the user mode, the smart plug 104 uses the network setting to connect the network base station 106 (i.e., the wireless link 116 of FIG. 1), and the smart plug 104 uses the login information to log in to the server 108. When the smart plug 104 completes logging in to the server 108, the server 108 records that the smart plug 104 is online in its own database, and records the relevant information. Because both the player 102 and the smart plug 104 use the same login information to log in to the server 108 and both are in the status of logged on to the server 108, the server 108 can know that the smart plug 104 is the plug for providing power to the player 102, and both of them are online. The server 108 records and pairs the player 102 with the smart plug 104 in its own database.

After pairing the player 102 with the smart plug 104, the server 108 may operate the player 102 via the smart plug 104. For example, the server 108 may turn on and off the player 102 via the smart plug 104, or record the power usage of the player 102 via the smart plug 104.

Because the player 102 and the smart plug 104 use the same login information to log in to the server 108, the server 108 can pair a plurality of players with their corresponding smart plugs (not shown) using the same method. The server 108 may operate the players via the corresponding smart plugs.

Figure 2:
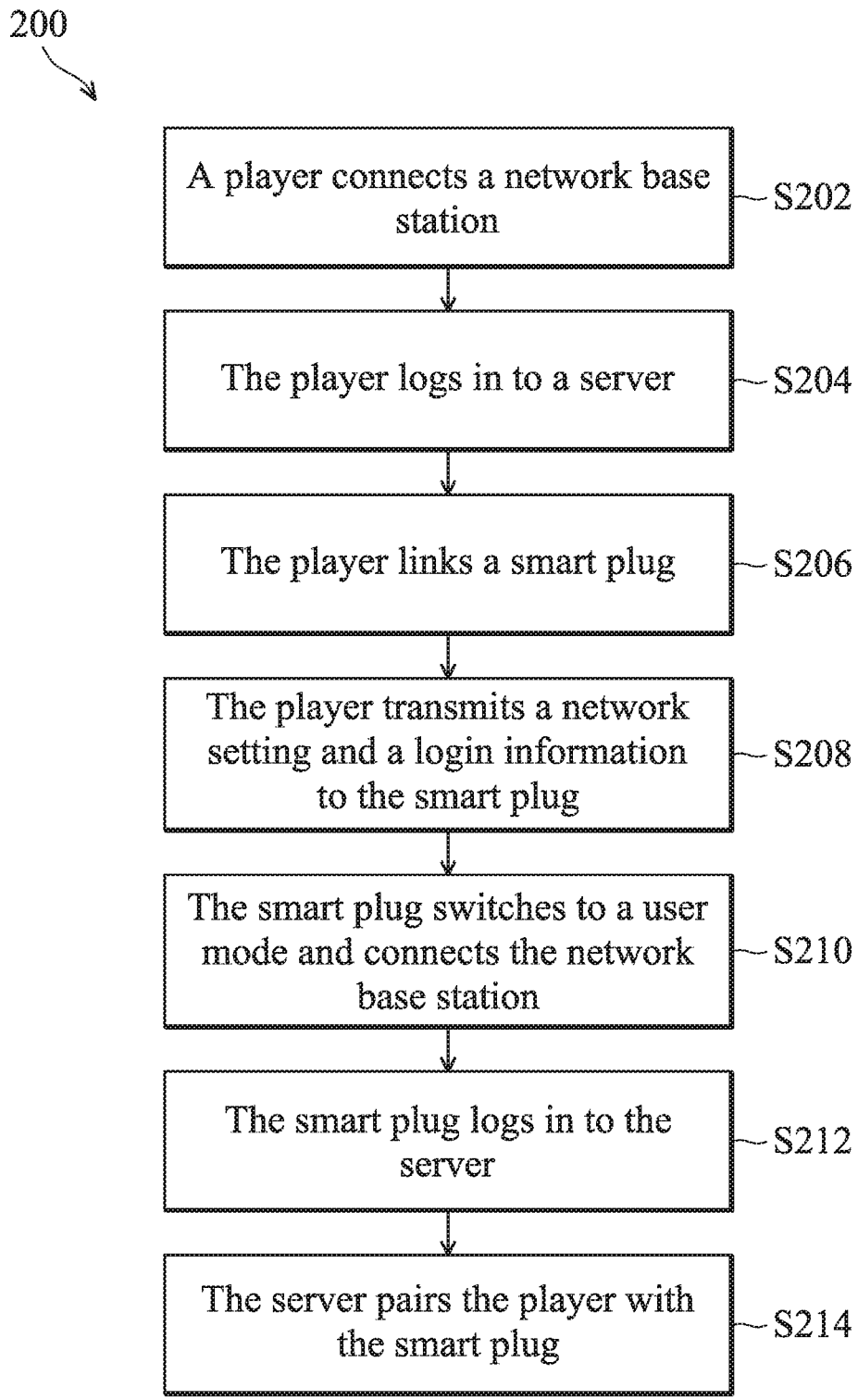
FIG. 2 is a flowchart of a digital signage system pairing method according to an embodiment of the present disclosure.

FIG. 2 is a flowchart of a digital signage system pairing method according to an embodiment of the present disclosure. The digital signage system pairing method 200 begins in step S202. In step S202, the player 102 uses a network setting to wirelessly connect a network base station 106. In one embodiment where the wireless network specification is a WiFi, the network setting includes a SSID and a password of the network base station 106. The network setting may be manually entered by the signage administrator when the connection is established, or it may have been previously stored in the player 102. After the player 102 successfully connects to the network base station 106, the method proceeds to step S204.

In step S204, the player 102 is further connected to the server 108 via the network base station 106, and the player 102 uses login information to log in to the server 108. The login information may be entered by the signage administrator when the login is established, or it may have been previously stored in the player 102. After the player 102 completes logging in to the server 108, the server 108 records that the player 102 is online linked in its own database and records the relevant information. After the player 102 successfully logs in to the server 108, the method proceeds to step S206.

In step S206, the player 102 connects a smart plug 104. In one embodiment where the wireless network specification is a WiFi, the player 102 will first disconnect from the network base station 106 and then connect the smart plug 104. In a preferred embodiment, the SSID of the smart plug 104 may include the name "smartplug" to make it easier for the player 102 to search for the smart plug 104. After the player 102 has found the SSID of the smart plug 104, the player 102 links to the smart plug 104. After the player 102 successfully establishes a wireless communication link to the smart plug 104, the method proceeds to step S208.

In step S208, the player 102 transmits the network setting and the login information to the smart plug 104, and the method proceeds to step S210. In step S210, the smart plug 104 first switches the operation mode to the user mode to prevent other devices from being connected to the smart plug 104. After switching to the user mode, the player 102 terminates the wireless link to the smart plug 104, and the player 102 re-connects and logs in to the server 108 via the network base station 106; at the same time, the smart plug 104 is connected to the network base station 106 using the network setting received from the player 102, and the method proceeds to step S212.

In step S212, the smart plug 104 is further connected to the server 108 via the network base station 106, and uses the login information received from the player 102 to log in to the server 108. Since the player 102 has previously used the login information to log in to the server 108, the server 108 determines that the smart plug 104 provides power to the player 102 in step S214. Therefore, the server 108 pairs the player 102 with the smart plug 104 in its own database, and the player 102 can be controlled by the smart plug 104, such as turning on and off the player 102.

In one embodiment, the player 102 further includes a computer host (not shown) to control the display content of the player. The computer host also has a wireless network connection function, and the computer host can connect a network base station and log in to the server 108 via the network base station.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A digital signage system, comprising:
   a smart plug, configured to provide power and having a wireless network connection function;
   a player, receiving the power from the smart plug and having the wireless network connection function; wherein
   the player uses a network setting to connect and log in to a server via a network base station; the player searches for the smart plug and wirelessly links to the smart plug directly, and the player transmits the network setting and login information to the smart plug, wherein the login information is used to log in to the server; the smart plug connects to the server via the network base station according to the received network setting, and the smart plug logs in to the server with the received login information thereby pairing the smart plug with the player;
   wherein the smart plug can operate in a base station mode and a user mode;
   the smart plug initially operates in the base station mode, and the smart plug switches from the base station mode to the user mode after receiving the network setting and the login information, and the player terminates the wireless link to the smart plug, and the player reconnects and logs in to the server, and the smart plug applies the network setting to connect the server via the network base station.

2. The digital signage system as claimed in claim 1, wherein a wireless network specification used by the smart plug, the player, and the network base station is WiFi.

3. The digital signage system as claimed in claim 1, wherein the smart plug can turn the player on and off.

4. A digital signage system pairing method, comprising:
   using a network setting to make a player connect and log in to a server via a network base station;
   using the player to search for a smart plug to wirelessly link to the smart plug directly and transmitting the network setting and login information to the smart plug, wherein the login information is used to log in to the server;
   connecting the smart plug to the server via the network base station according to the network setting received by the smart plug, and logging the smart plug in to the server with the received login information thereby pairing the smart plug with the player;
   wherein the smart plug can operate in a base station mode and a user mode; wherein the method further comprises:
   making the smart plug initially operate in the base station mode, and switching the smart plug from the base station mode to the user mode after receiving the network setting and the login information, and terminating the player's wireless link to the smart plug, and making the player re-connect and log in to the server, and applying the network setting to the smart plug for connecting to the server via the network base station.

5. The digital signage system pairing method as claimed in claim 4, wherein a wireless network specification used by the smart plug and the player is WiFi.

6. The digital signage system pairing method as claimed in claim 4, further comprising: turning the player on and off using the smart plug.

* * * * *